United States Patent [19]
Leach

[11] 3,782,476
[45] Jan. 1, 1974

[54] FLAME PROOFING METHOD

[76] Inventor: Irby H. Leach, 2094 Emerson, Napa, Calif. 94558

[22] Filed: June 7, 1972

[21] Appl. No.: 260,619

[52] U.S. Cl. ..................... 169/1 A, 169/2 R, 252/3
[51] Int. Cl. ............................................... A62c 1/12
[58] Field of Search ..................... 169/1 A, 2 R, 14, 169/15; 252/2–6, 6.5, 8.05

[56] References Cited
UNITED STATES PATENTS

| | | | |
|---|---|---|---|
| 3,303,886 | 2/1967 | Tattersall et al. | 169/15 UX |
| 3,533,473 | 10/1970 | Jamison | 169/1 A |
| 3,581,826 | 6/1971 | Dougan | 169/15 |
| 3,657,305 | 4/1972 | Morehouse | 252/8.05 X |
| 3,677,347 | 7/1972 | Rosen et al. | 252/3 X |

FOREIGN PATENTS OR APPLICATIONS

| | | | |
|---|---|---|---|
| 541,678 | 12/1941 | Great Britain | 169/2 R |

Primary Examiner—Robert S. Ward, Jr.
Attorney—Stephen S. Townsend et al.

[57] ABSTRACT

Expanded, foamed plastic such as foamed plastic beads having a minimum density of 0.5 pounds per cubic foot and preferably of 0.4 pounds per cubic foot or less are fire extinguishing or retard the propagation of flames even though constructed of an otherwise flammable substance. The low density foamed material can be applied to exterior surfaces of objects, can be intermixed with flammable material or can be filled inside soft or hard shells to provide flame proofing. Flames can be retarded or extinguished by placing the low density foamed plastic material on burning objects.

16 Claims, 7 Drawing Figures

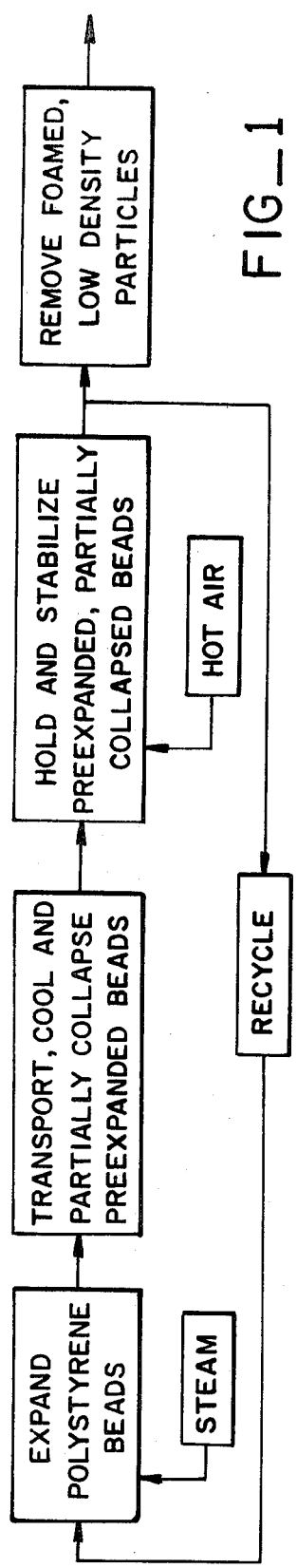
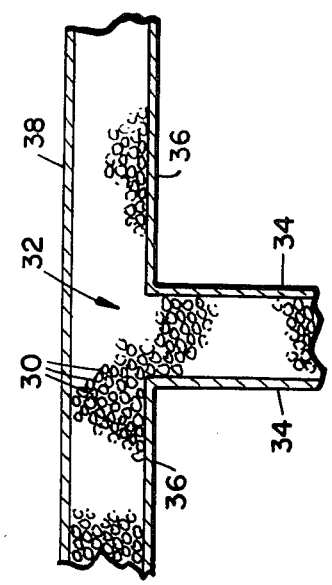
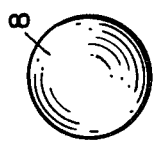
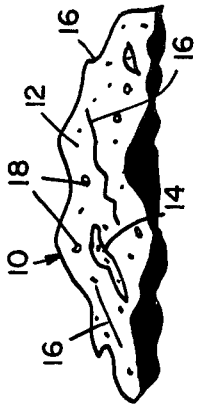
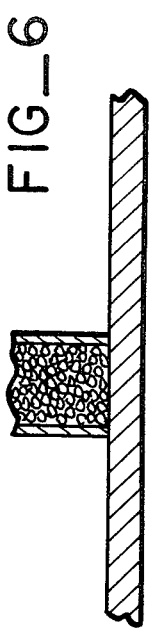
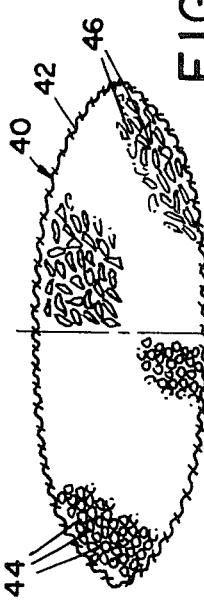
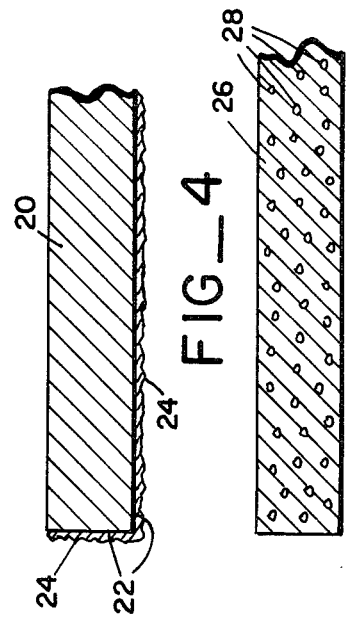

3,782,476

FLAME PROOFING METHOD

BACKGROUND OF THE INVENTION

Expanded or foamed plastic such as polystyrene is presently in wide use for a variety of products which take advantage of the low density and structural integrity of the foamed plastic. Particularly useful low density plastic foam and method and apparatus for making such foam is disclosed and claimed in the inventor's U.S. Pats. 3,639,551, 3,630,820, and 3,627,211.

Foamed lightweight plastic is increasingly used but the material is generally considered highly flammable particularly in its foamed state. Consequently, where flammability was a problem resort had to be taken to other, otherwise perhaps less desirable materials.

SUMMARY OF THE INVENTION

The present invention rests on the discovery that foamed lightweight plastic material, which is normally flammable, becomes nonflammable and thereby a flame retardant when the density of the foamed material is less than about 0.5 pounds per cubic foot and preferably less than about 0.4 pounds per cubic foot. At such low densities the foamed material is flame resistant, that is it does not ignite, is self-extinguishing and smothers a flame. This appears to be based on a rate of heat dissipation which exceeds the rate at which heat is generated by a flame. In particular, the self-extinguishing characteristic appears to be based on the removal of fuel for the flame and of heat from the combustion zone by the melt-back of the foamed plastic. Although this conclusion is somewhat speculative, applicant believes that it is further borne out by the fact that when the foamed material is compacted to a density of about 0.7 pounds per cubic foot the self-extinguishing feature disappears and the material becomes highly flammable.

Accordingly, the present invention provides a flame proofing method for retarding flame propagation or extinguishing a flame comprising the step of smothering the flame with foamed plastic material having a density of less than about 0.5 pounds per cubic foot. For the purposes of this disclosure and the claims the term "flame proof" or "flame proofing" refers to and means the smothering, extinction or retardation of fires or flames, the retardation of fire or flame propagation, non or substantially delayed ignition and the like.

The foamed material can comprise expanded, essentially spherical foamed beads or shredded foamed particles formed from beads or the like as disclosed in the above-reference U.S. patents. Furthermore, in accordance with the invention, materials such as acoustical tile, particle boards, soft goods, e.g. pillows or toys, and solid structures such as hollow building walls, beams and the like can be flame-proofed by applying the low density particles to exterior surfaces, incorporating them in the materials, say a particle board, by filling soft goods or voids such as hollow walls with the low density foamed plastic. In each case, flammability of the base material is dramatically reduced or eliminated.

Since foamed plastic beads can be manufactured at very low costs, the present invention provides an ideal, inexpensive and lightweight fire proofing method.

BRIEF DESCRIPTION OF THE DRAWINGS

FIG. 1 is a schematic flow diagram illustrating the steps for producing stable low density plastic particles for use in the present invention;

FIG. 2 is a grossly enlarged view of an irregularly shaped, shredded, low density foamed particle;

FIG. 3 is an enlarged view of a spherical expanded low density foamed particle;

FIG. 4 is a cross-sectional view of an object such as an acoustical tile having an exterior surface that is fire proofed with a layer of low density foamed plastic in accordance with the invention;

FIG. 5 is a cross-sectional view of an object, such as a particle board, in which low density beads are incorporated in a base material for reducing the flammability of the base material;

FIG. 6 is a fragmentary elevational view through a building wall and ceiling in which hollow wall and ceiling spaces are filled with low density foam in accordance with the present invention to retard the flammability of the structure; and FIG. 7 is a cross-sectional view through a pillow showing, on the lefthand half, the pillow filled with the low density expanded beads illustrated in FIG. 3 and, on the right-hand half, the pillow filled with the shredded low density foamed particles illustrated in FIG. 2.

DESCRIPTION OF THE PREFERRED EMBODIMENTS

Referring first to FIG. 1, the process of expanding plastic beads into low density foamed particles is briefly described. A more complete description of the process is found in the above-reference U.S. Pat. No. 3,639,551. The plastic beads are initially expanded by injecting temperature controlled steam into a chamber to raise the chamber pressure and temperature to the desired level. The elevated temperature in the expansion chamber activates the propellant in the polystyrene to thereby expand the beads. When the expansion chamber is filled, expanded beads are continuously withdrawn from the top of the chamber through a suction line and pneumatically transported to a holding chamber. The holding chamber has a temperature of between about 140° to about 190° F.

During transportation to the holding tank, the expanded beads collapse partially. In the heated atmosphere of the holding tank they experience a partial recovery and become stabilized. Thereafter the beads are recycled into the expander for additional expansion at a slightly elevated temperature to further lower their density. They are then recycled to the holding tank. This process is repeated until the desired maximum bead density of 0.5 pounds per cubic and preferably of 0.4 pounds per cubic foot is attained. Thereafter the beads are removed from the holding tank for suitable storage.

The low density character can be imparted to a wide variety of plastic materials to enhance or impart non-flammability to the plastic material. Besides polystyrene, which is the preferred material, other homo- and copolymers may be employed. These include such additional polymers as polyethylene, polypropylene, polyacrylates, polyvinyl halides, polyacrylonitrile and the like. Both hydrocarbon and non-hydrocarbon addition polymers may be used.

Condensation polymers may also be employed, such as polyethers, polyesters and the like. Any foamable plastic can be advantageously foamed to the desired density to enhance its fire extinguishing characteristics.

Referring now to FIGS. 2 and 3, the plastic beads are expanded into low density foamed spheres 8. For many applications such as for fire proofing soft goods, hollow walls and the like, spheres 8 are used. For certain applications, such as coating exterior surfaces of beams, boards, acoustical tile and the like, spheres are inconvenient. In such instances the spheres are shredded, preferably in accordance with U.S. Pat. No. 3,627,211, to form a low density shredded particle 10. Such particles have a maximum dimension of no more than about three sixteenths inch and randomly shaped, nonplanar and uneven exterior surfaces 88, randomly disposed, sized and formed tears 14 extending from the exterior surface towards the center of the particle and ragged or serrated ridges or edges 16. The total exterior surface area of the particle is therefore defined by the exterior surfaces, the surfaces defined by the tears and those defined by the ridges. These surfaces intersect large numbers of formerly closed foam cells 18 which therefore become open cells.

Referring now to FIG. 4, an article 20 such as an acoustical tile, a beam, a board or the like is flame proofed in accordance with the invention by applying to at least some of its exterior surfaces 22 a layer 24 of a low density foamed plastic, preferably a layer of shredded particles 10. The layer can be bonded to the exterior surfaces in any convenient manner as by initially applying a wet bonding layer to the surface and thereafter blowing the shredded low density foamed particles against the wet surface. The low density foam layer can also be used for flame proofing nonflammable materials such as steel beams to temporarily insulate them against heat.

Referring to FIG. 5, an article 26 of a combustible material such as certain particle board, fiberboard and the like can be flame proofed, that is its flammability can be substantially reduced or eliminated by incorporating into the slurry from which the article is formed a substantial amount of low density foamed particles 28. The particles are preferably expanded, closed cell beads. The use of shredded particles, which include substantial numbers of open cells, is less preferred since the open cells might absorb a substantial amount of the slurry or the like.

Referring to FIG. 6, in another application of the flame proofing method of the present invention low density foamed plastic particles 30 completely fill a hollow space 32 between upright building walls 34, a ceiling 36 and a floor 38 thereabove. The particles are preferably foamed low density spheres and they are pneumatically blown or poured into hollow spaces. The presence of the low density beads in the empty spaces greatly reduces or eliminates the flammability of structural members such as wooden rafters (not shown), posts (not shown) and the like and isolates such members from heat and possible heat dammage such as warping.

Referring to FIG. 7, yet another application of the fire proofing method of the present invention is for stuffing soft good articles 40 such as pillows, soft toys and the like. A soft outer shell 42, such as a pillow case, the exterior of a toy or the like if filled with low density expanded spheres 44 (lefthand half of FIG. 7) or with shredded low density foamed particles 46 (righthand half of FIG. 7). The stuffing of the soft good article is thus nonflammable. This greatly diminishes the danger to which persons and particularly children are exposed if the soft article is ignited.

The invention is further illustrated by the following examples.

EXAMPLE 1

Commercial grade acrylonitrile styrene copolymer beads having a low boiling hydrocarbon propellant (pentane) included therein and a diameter between about one sixty-fourth – one thirty-second inch were stored in a hopper and fed into the expansion chamber of a "Buccaneer" preexpander (available from the TRI Manufacturing and Sales Company, Lebanon, Ohio). In the expansion chamber saturated steam of an absolute pressure of about 15 psi and of a temperature between about 212° to about 220° F was present.

The beads were retained in the expansion chamber about 2 minutes. The temperature and/or pressure conditions were such that the acrylonitrile styrene beads expanded beyond their stable volume or density. The expanded beads were pneumatically removed from the chamber and they partially collapsed, that is, their volume was partially reduced.

The beads were then placed in a holding tank at 160° to 180° F and recycled to the expansion chamber for a total of four cycles substantially as described in the above referenced U.S. Pat. No. 3,639,551. The finished expanded, stable beads had a density of 0.39 pounds per cubic foot.

From the expanded beads ten random samples were selected and filled into 4 × 4 × 6-inch deep wire mesh baskets having a one fourth inch mesh. The basket was placed on a piece of sheet metal under a fume hood and a reagent tablet (methenamine reagent tablet No. 1,588 available from Eli Lilly and Company, Minneapolis, Ind.) was held with tongs and ignited with a match. The burning tablet was gently set on top of the spheres in the basket and the elapsed time from that moment to when the flame on the tablet was extinguished or until the tablet had completely burned its way to the bottom of the basket with no evidence of flame in the beads or in their melted residue was recorded.

Table 1 illustrates the time interval on 10 random samples of acrylonitrile styrene beads expanded as described above to an 0.39 pounds per cubic foot density. The reagent pills burned an average time of 3.3 second with a maximum of 4 seconds and a minimum of 2 seconds.

TABLE 1

Loose Fluff/0.39 PCF

| SAMPLE NO. | BURN TIME | OBSERVATION |
| --- | --- | --- |
| 1. | 4 sec. | Pill went out |
| 2. | 3 sec. | Pill went out |
| 3. | 4 sec. | Pill went out |
| 4. | 4 sec. | Pill went out |
| 5. | 4 sec. | Pill went out |
| 6. | 2 sec. | Pill went out |
| 7. | 3 sec. | Pill went out |
| 8. | 3 sec. | Pill went out |
| 9. | 4 sec. | Pill went out |
| 10. | 3 sec. | Pill went out |

Average Burn Time — 3.3 sec.

The above-described test is based on the GSA-FSN 8,135–935–0983 Federal Government Flammability Test. According to that test a sample is unacceptable, that is, it cannot be considered flame retarding or flame proof if the pill burns for more than 41 seconds. The low density foamed particles greatly exceed all requirement set forth under that test.

EXAMPLE 2

To compare the effects of low density foamed acrylonitrile styrene copolymer beads having a density of about 0.70 pounds per cubic foot were subjected to the above-described test. Each of the ten random test samples permitted the reagent pill burn for more than 40 seconds. Consequently, the 0.7 pounds per cubic foot dense particles failed the flame proof test.

EXAMPLE 3

Acrylonitrile styrene copolymer expanded foamed beads of a density of 0.5 pounds per cubic foot were tested in the manner described in Example 1. The tests showed an average reagent pill burn time of about 11 seconds. Thus, with an 0.5 pound per cubic foot density, the requirements of the above-referenced flammability test are still greatly exceeded although the pill burn time is greater than at the lower 0.39 pound per cubic foot density.

I claim:

1. A method for extinguishing a flame comprising the step of smothering the flame with a foamed polymeric, normally flammable plastic material having a density of less than about 0.5 pounds per cubic foot.

2. A method according to claim 1 wherein the density is no more than about 0.4 pounds per cubic foot.

3. A method of retarding the propagation of flames comprising the step of covering a material subjected to the flames with a multiplicity of foamed polymeric, normally flammable plastic particles having a density of less than about 0.5 pounds per cubic foot.

4. A method according to claim 3 wherein the foam particles comprise closed cell, generally spherical particles.

5. A method according to claim 4 wherein the particles comprise at least partially open-celled, foamed, randomly shaped particles having randomly disposed, ruptured and nonplanar exterior surfaces including torn indentations in the surfaces and ragged projections protruding from the surfaces so that a substantial portion of the cells communicate with the exterior atmosphere.

6. A method according to claim 5 wherein the particles have a maximum dimension of no more than about three sixteenths -inch.

7. A method for retarding the propagation of flames on a flammable material comprising the steps of adding to the material a foamed polymeric, normally flammable plastic substance having a density of less than about 0.5 pounds per cubic foot.

8. A method according to claim 7 wherein the step of adding comprises the step of distributing the substance through at least a portion of the material.

9. A method according to claim 7 wherein the step of adding comprises the step of forming a surface layer of the substance on the material.

10. A method according to claim 9 wherein the step of forming comprises the step of completely covering at least a portion of the surface of the material with the substance.

11. A method according to claim 10 wherein the substance comprises a multiplicity of individual foamed plastic particles having nonplanar, randomly distributed and uneven exterior surfaces, randomly distributed tears extending from the exterior surfaces towards the interior of the particle, randomly distributed serrated ridge members, and a substantial number of open foam cells defined by the intersection of cell walls and surfaces of the particle, surfaces defined by the tears and surfaces defined by the ridge members.

12. A method according to claim 10 wherein the substance comprises a multiplicity of individual, small, randomly shaped particles including irregular tear surfaces.

13. A flame proofing method comprising the step of introducing in conjunction with a flammable material a sufficient amount of a foamed polymeric, normally flammable plastic substance having a density of no more than about 0.5 pounds per cubic foot to retard the propagation of flames by the material.

14. A method according to claim 13 where in the step of introducing comprises the step of placing the substance against an exterior surface of the material.

15. A method according to claim 13 wherein the step of introducing comprises the step of admixing the substance with the material.

16. A method according to claim 13 wherein the step of introducing comprises the step of enveloping the substance with the material.

* * * * *